United States Patent [19]

Umetsu et al.

[11] Patent Number: 4,964,522

[45] Date of Patent: Oct. 23, 1990

[54] THERMOPLASTIC BLOWN BOTTLE WITH A HANDLE

[75] Inventors: Yukihide Umetsu, Tokyo; Hideo Hasegawa, Hiratsuka; Toshio Takahashi, Hiratsuka; Masayuki Miyagawa, Hiratsuka, all of Japan

[73] Assignees: Mitsubishi Plastics Industries Limited, Tokyo; Kikkoman Corporation, Noda, both of Japan

[21] Appl. No.: 384,918

[22] Filed: Jul. 26, 1989

Related U.S. Application Data

[63] Continuation of Ser. No. 186,238, Apr. 26, 1988, abandoned.

[30] Foreign Application Priority Data

May 9, 1987 [JP] Japan ............................ 62-122241
May 29, 1987 [JP] Japan ............................ 62-83159
Jun. 9, 1987 [JP] Japan ............................ 62-88867

[51] Int. Cl.⁵ .................. B65D 23/10; B65D 25/28
[52] U.S. Cl. ........................... 215/100 A; 220/94 R; 220/94 A
[58] Field of Search ................ 215/100 A, 100 R; 220/94 R, 94 A; 294/27.1, 31.2

[56] References Cited

U.S. PATENT DOCUMENTS

| | | | |
|---|---|---|---|
| 3,140,329 | 7/1964 | Nutting | 215/100 A |
| 4,257,525 | 3/1981 | Thompson | 215/100 A |
| 4,273,246 | 6/1981 | Thompson | 215/100 A |
| 4,363,415 | 12/1982 | Rainville | 215/100 A |
| 4,372,454 | 2/1983 | Thompson | 215/100 A |
| 4,727,997 | 3/1988 | Nakamura et al. | 215/100 A |

FOREIGN PATENT DOCUMENTS 889343 2/1962 United Kingdom .......... 215/100 A

Primary Examiner—Sue A. Weaver
Attorney, Agent, or Firm—Oblon, Spivak, McClelland, Maier & Neustadt

[57] ABSTRACT

A thermoplastic blown bottle with a handle comprises a bottle body with a concave portion at its upper circumferential part and a handle attached to the concave portion, wherein the handle has a grip portion in an elongated form, fitting parts extending laterally from the both ends of the grip portion, and projections extending outwardly from the end portion of the fitting parts to be engaged with the innermost part of the concave portion so as to fix the handle.

6 Claims, 10 Drawing Sheets

FIGURE 4
FIGURE 5
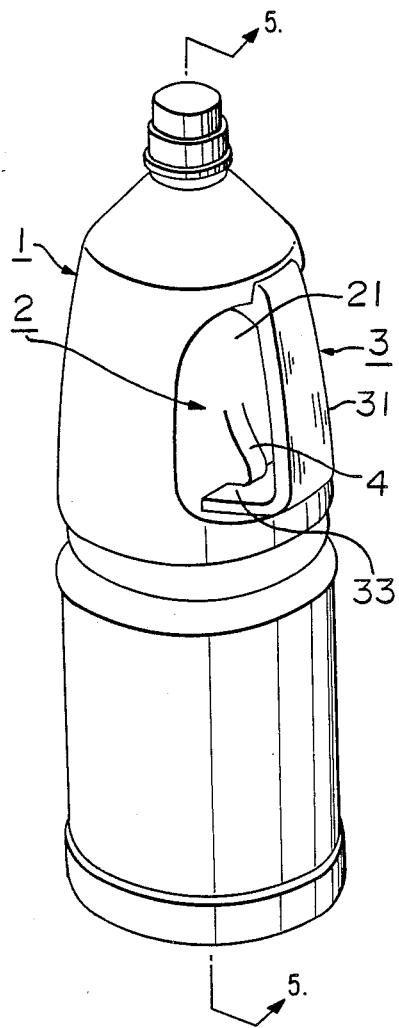
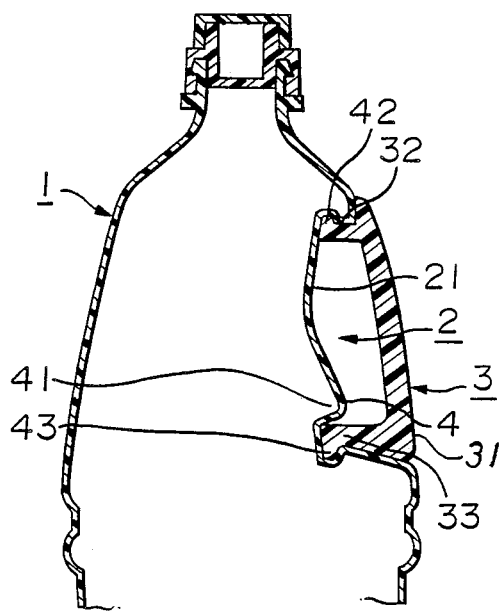

FIGURE 13
FIGURE 14
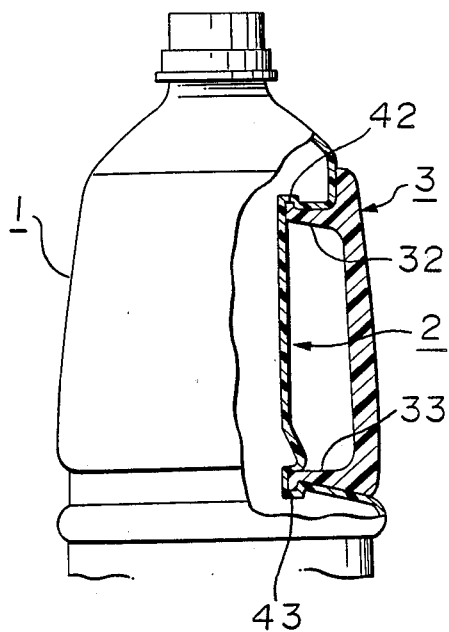
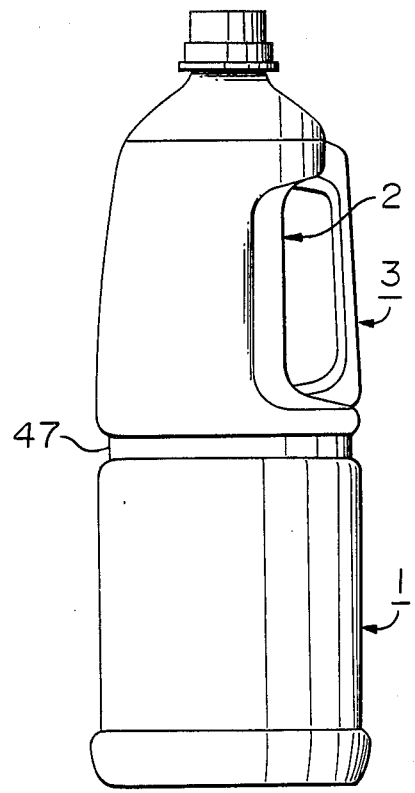

THERMOPLASTIC BLOWN BOTTLE WITH A HANDLE

This application is a continuation of application Ser. No. 186,238, filed on Apr. 26, 1988, now abandoned.

BACKGROUND OF THE INVENTION

1. Field of the Invention

The present invention relates to a thermoplastic blown bottle comprising a bottle body and a handle attached to the bottle body.

2. Discussion of Background

It is difficult to handle a large-sized thermoplastic blown bottle. Accordingly, a blown bottle with a handle of a one-piece structure is used for containing therein liquid such as a detergent. However, since it is difficult to form the bottle and the handle in one piece by using a polyester resin such as polyethylene terephthalate, there is a proposal of a bottle formed in such a manner that a concave portion 2' is formed at the upper part of the bottle and a separately prepared handle 3' is fitted to the concave portion 2' as shown in a front view in FIG. 17.

However, the conventional bottle formed by fitting the handle to the concave portion 2' at the upper circumferential portion of the bottle has disadvantages as follows.

Since a draw ratio in the portion to which the handle is fitted is large, it was difficult to cause a sufficient deformation of material at that portion so as to attach the handle. Further, strength in the portion to which the handle is fitted is insufficient because the thickness of the portion is thin.

SUMMARY OF THE INVENTION

It is an object of the present invention to provide a thermoplastic blown bottle with a handle attached to the bottle with a sufficient strength.

The foregoing and the other objects of the present invention have been attained by providing a thermoplastic blown bottle with a handle which comprises a bottle body with a concave portion at its upper circumferential part and a handle attached to the concave portion, wherein the handle has a grip portion in an elongated form, fitting parts extending laterally from the both ends of the grip portion, and projections extending outwardly from the end portion of the fitting parts to be engaged with the innermost part of the concave portion so as to fix the handle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a perspective view of a second embodiment of the blown bottle with a handle according to the present invention;

FIG. 5 is a cross-sectional view partly ommitted taken along a line 5—5 in FIG. 4;

FIG. 13 is a front view partly cross-sectioned and partly removed of the blown bottle shown in FIG. 11;

FIG. 14 is a front view of a modified embodiment of the fifth embodiment of the present invention;

DETAILED DESCRIPTION OF THE REFERRED EMBODIMENTS

Figure 1:
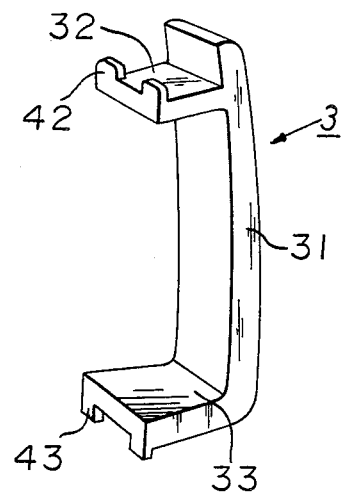
FIG. 1 is a perspective view of an embodiment of the handle used for a bottle according to the present invention.
Figure 2:
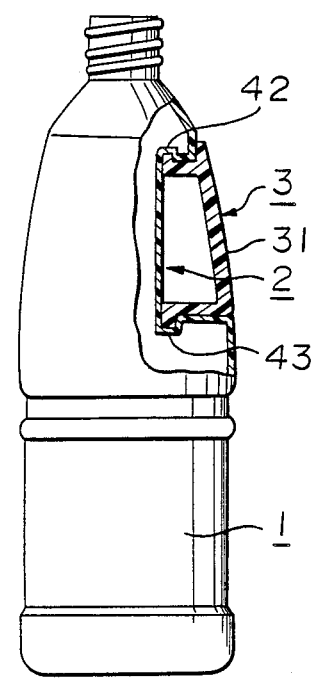
FIG. 2 is a front view partly cross-sectioned of an embodiment of the blown bottle with a handle according to the present invention.

Referring to the drawings, wherein the same reference numerals designate the same or corresponding parts throughout the several views, and more particularly to FIGS. 1 and 2 thereof, there is shown a perspective view and a front view of a first embodiment of the thermoplastic blown bottle with a handle according to the present invention.

In FIGS. 1 and 2, a handle 3 comprises a grip portion 31 in an elongated form, fitting parts 32, 33 projecting laterally from both end parts of the grip portion 31, which provides a generally channel-like shape. A projection 42 is formed at the free end of the upper fitting part 32 so as to extend outwardly, and a projection 43 is formed at the free end of the lower fitting part 33 so as to extend outwardly. The shape of the projections 42, 43 may be determined as desired as far as they can be firmly engaged with the bottle surface. In this embodiment, two projections are formed in each fitting part 32, 33 so that the handle is fixedly connected to the bottle when the bottle is shaped by blow-molding.

The handle 3 is usually manufactured by injection molding of a thermoplastic material.

FIG. 2 shows how the handle 3 is attached to the bottle.

At the upper circumferential part of the bottle 1, there is formed a concave portion 2 for fitting the handle. It is understood that the projections 42, 43 of the handle 3 are embedded in the wall surface of the bottle at the innermost part of the upper and lower parts of the concave portion 2, i.e. at positions near the central axis of the bottle. Since the innermost part of the concave portion has a relatively large wall thickness and is easily molded, the projections 42, 43 are certainly embedded in the bottle.

The outer surface of the grip portion 31 of the handle 3 is made substantially flush with the outer circumferential surface of the bottle 1 so as to avoid requirement of an additional space for storage and transportation. For this purpose, the size of the concave portion 2 is so determined as to allow fingers to enter in a space formed between the handle 3 and the concave portion 2 when the handle 3 is fitted.

Usually, it is preferable that the depth of the concave portion 2 is about ¼-⅓ as large as the diameter of the upper portion of the bottle 1.

In preparing the bottle, for example, a handle is previously set in a blow mold for the bottle, and blow-molding is carried out for the bottle so that the projections 42, 43 are surrounded by and embedded in the bottle surface.

Figure 3:
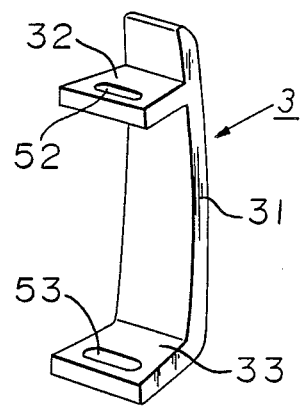
FIG. 3 is a perspective view of another embodiment of the handle according to the present invention.

FIG. 3 is a perspective view showing another example of the handle. The handle is provided with a recess or a through hole 52 or 53 near the free end of the fitting part 32 or 33. In the case as shown in FIG. 3, a part of surface wall of the concave portion protrudes in the recesses 52, 53 when the bottle is blow-molded, to thereby connect the handle 3 to the bottle 1. The thermoplastic blown bottle of the present invention is suitable as a large-sized bottle having a volume of 1 litter or greater and made of a polyester resin.

Thus, in the above-mentioned first embodiment, the handle is attached to the bottle at a position of the upper and lower parts in the innermost part of the concave portion which has a relatively thick wall because of its having a low draw ratio, and therefore, it is easily formed into a desired shape by molding. Accordingly, the handle can be firmly connected with a sufficient strength. Further, since the upper and lower parts of the concave portion are supported by the fitting parts of the handle, the concave portion is seldom deformed.

A second embodiment of the thermoplastic blown bottle with a handle according to the present invention will be described with reference to FIGS. 4 and 5.

In FIGS. 4 and 5, the same reference numerals as in FIGS. 1 to 3 designate the same or corresponding parts, and therefore, description of these parts is ommitted.

The construction of the second embodiment of the present invention is the same as the first embodiment except that a part of the vertical surface 21 in the concave portion 2 is outwardly expanded so that the end of the lower fitting part is downwardly pressed by the expanded portion.

As shown in FIG. 5, the projections 42, 43 outwardly projecting from the end portion of the fitting parts 32, 33 which laterally extend from the upper and lower parts of the handle 3, are embedded in the bottle surface at the innermost part (close to the central axis of the bottle) of the upper and lower parts of the concave portion 2.

Since the expanded portion 4 of the vertical surface 21 at the innermost part of the concave portion 2 downwardly presses the lower fitting part 33 of the handle, there is obtainable a strong connection. Further, since a recess 41 is formed inside the bottle at a position corresponding to the expanded portion 4 and the recess 41 functions as an air chamber when liquid contained in the bottle is to be dispensed, the liquid can be regularly discharged. The shape of the expanded portion 4 may be in an vertically elongated form as shown in FIG. 4, or may be in a laterally elongated form.

In preparing the bottle according to the second embodiment, for example, a handle 3 is previously set in a blow mold having a cavity corresponding to the shape of the bottle including the expanded portion 4, and then a blow-molding of the bottle 1 is carried out, whereby the projections 42, 43 are embedded in the bottle at the upper and lower parts of the concave portion 2, and at the same time, the lower fitting part 33 of the handle is downwardly pressed by the expanded portion 4 formed in the vertical surface 21.

Thus, in the second embodiment of the present invention, by forming an expanded portion by outwardly expanding a part of the vertical surface of the concave portion to downwardly press the low-r fitting part of the handle, the following advantages are obtainable:

(1) a small recess formed in the bottle at a position corresponding to the expanded portion prevents irregular discharge of liquid contained therein;

(2) the handle, especially the lower part of the handle can be certainly fixed to the bottle;

(3) by adjusting the size of the expanded portion, a space between the concave portion and the handle can be suitable for fingers to be put in the concave portion, which insures gripping the handle; and (4) the expanded portion increases the draw ratio of the vertical surface of the concave portion, whereby the strength and heat resistance property of the material can be increased.

Figure 6:
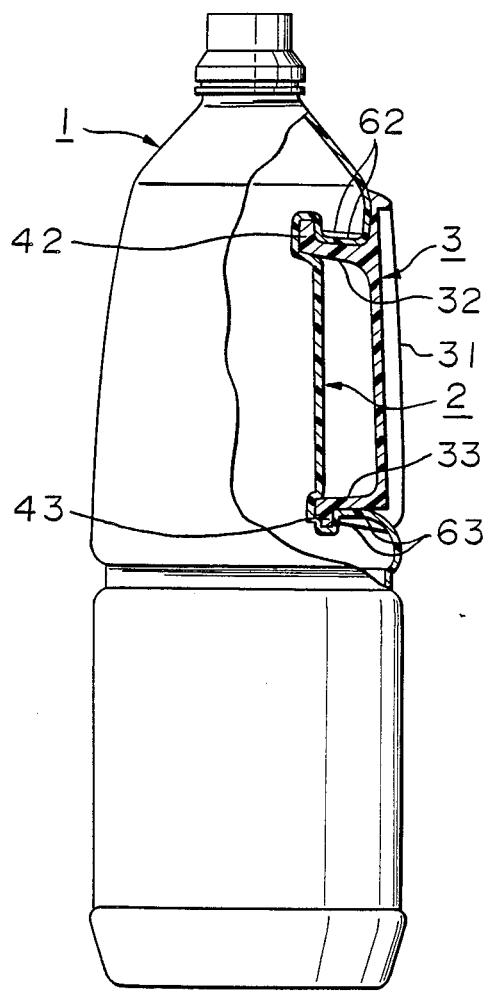
FIG. 6 is a front view partly cross-sectioned of a third embodiment of the blown bottle with a handle according to the present invention.
Figure 7:
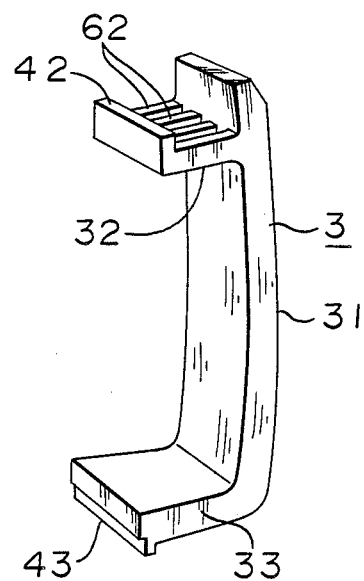
FIG. 7 is a perspective view of an embodiment of the handle of the present invention.
Figure 8:
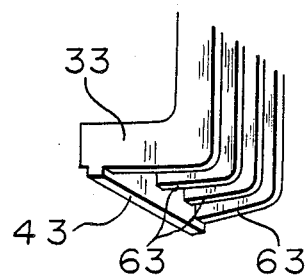
FIG. 8 is a perspective view showing the lower portion of the handle shown in FIG. 7.

FIGS. 6-8 show a third embodiment of the thermoplastic blown bottle with a handle according to the present invention. In FIGS. 6-8, the same reference numerals as in FIGS. 1-5 designate the same or corresponding parts, and therefore, description of these parts is ommitted. A reference numeral 62 designates at least one raised or recessed stripe portion formed in the upper surface of the upper fitting part 32, and a numeral 63 designates at least one raised or recessed portion formed in the lower surface of the lower fitting part 33.

The projections 42, 43 of the fitting parts of the handle 3 are embedded in the wall portion of the bottle at the innermost portion at the upper and lower parts of the concave portion 2. Since the innermost part of the concave portion 2 has a relatively large wall thickness and is easily formed by molding, the projections 42, 43 can be certainly embedded. In addition, the wall surface of the bottle surrounds the raised portion or protrudes in the recessed stripe portions formed in the fitting parts 32, 33 to thereby prevent lateral movement of the handle 3 with respect to the bottle. The direction of the raised or recessed stripe portion is along the extension of the fitting parts. This allows easy blow-forming of the bottle because the direction of expansion of the material coincides to the direction of the stripe portions.

Figure 9:
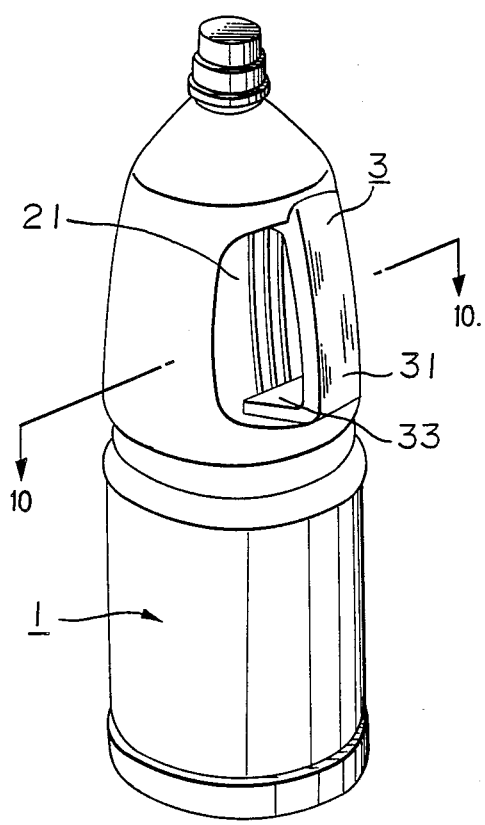
FIG. 9 is a perspective view of a fourth embodiment of the blown bottle with a handle according to the present invention.
Figure 10:
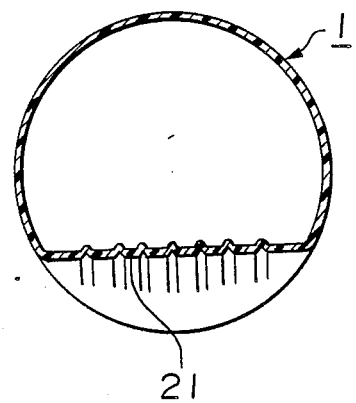
FIG. 10 is a cross-sectional view taken along a line 10—10 in FIG. 9 in which the handle is removed.

FIGS. 9-10 show a fourth embodiment of the present invention. In the drawings, the same reference numerals designate the same or corresponding parts.

In FIGS. 9 and 10, vertically extending grooves are formed in the vertical surface 21 of the concave portion 2. The grooves may be formed when the bottle 1 is blow-molded. The grooves may be formed in the entire region from the upper part to the lower part in the vertical surface 21, or may be formed in a half area in the vertical direction of the vertical surface 21. Further, a thick-walled portion in a stripe form (a solid rib) may be provided in the vertical direction in the vertical surface 21.

In accordance with the fourth embodiment, a rib structure comprising a number of linear projections or grooves extending in the vertical direction in the vertical surface of the concave portion is formed. Accordingly, the draw ratio of the vertical surface is increased to thereby increase the strength of this area. As a result, deformation of the concave portion is greatly minimized, and therefore connection of the handle to the bottle can be stable.

FIGS. 11-14 show a fifth embodiment of the present invention. In the Figures, the same reference numerals designate the same or corresponding parts.

As shown in FIGS. 11-14, the thermoplastic blow bottle is provided with a concave portion 2 at the upper circumferential surface, a handle 3 attached to the bottle so as to vertically bridge the concave portion 2, and an annular groove 47 formed just below the concave portion 2 so as to be communicated therewith or independently.

The annular groove 47 provided just below the concave portion 2 functions to balance the thickness of wall of the bottle, namely, it prevents the wall thickness at the lower part of the concave portion becoming thin. It is preferable that the depth of the annular groove 47 is in the range of from 2 mm to 5 mm and the width is in the range of from 3 mm to 15 mm to obtain the above-mentioned effect.

Figure 11:
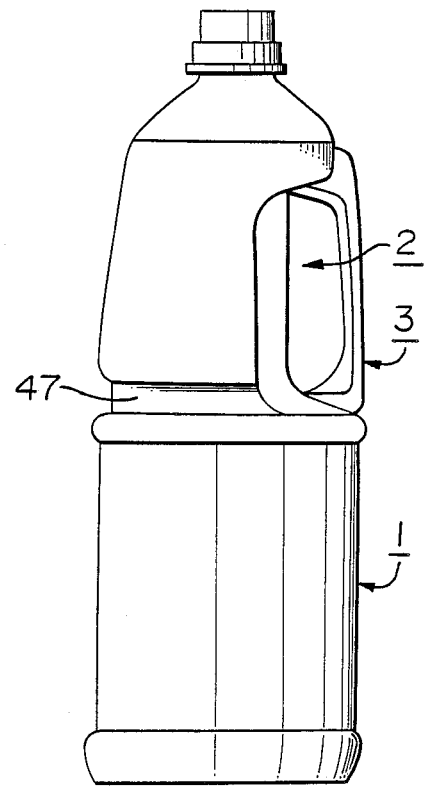
FIG. 11 is a front view of a fifth embodiment of the blown bottle with a handle according to the present invention.
Figure 12:
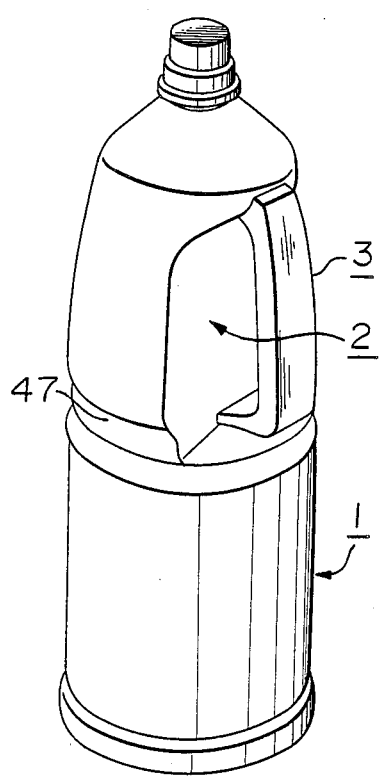
FIG. 12 is a perspective view of the bottle shown in FIG. 11.

In the embodiment as shown in FIGS. 11-13, since the annular groove 47 is provided so as to communicate with the lower part of the concave portion 2, the thickness of the bottom wall at the lower part of the concave portion 2 is not reduced, and the wall thickness of the bottle around the annular groove is becomes even to thereby increase the strength of this area.

In the embodiment shown in FIG. 14, the annular groove 47 is formed independent of the concave portion 2. When the annular groove 47 is formed at a distance of 15 mm or smaller from the lower part of the concave portion 2 to the upper part of the annular groove 47, there is obtainable a great effect of preventing a thin wall thickness.

In accordance with the fifth embodiment, an annular groove 47 is formed just below the concave portion 2 so as to be communicated with the lower part of the concave portion 2 or to be independent of the concave portion 2. Accordingly, the annular groove eliminates reduction in strength of the bottle caused by an unbalanced stretching force and the shape at the upper circumferential surface of the bottle where a concave portion to be attached with a handle is formed, with the result that undesired deformation of the bottle due to application of heat, an external force, an inner pressure and so on, and occurrence of a gap between the fitting part of the handle and the bottle can be eliminated.

Figure 15:
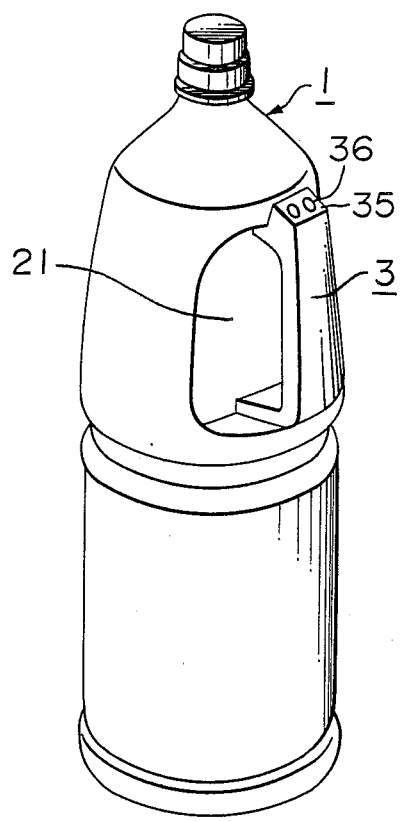
FIG. 15 is a perspective view of an sixth embodiment of the blown bottle with a handle according to the present invention.
Figure 16:
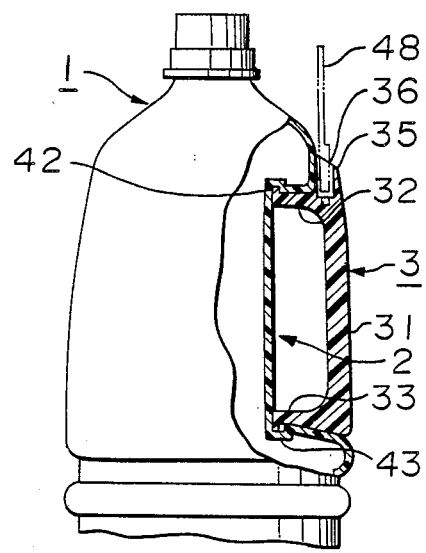
FIG. 16 is a front view partly cross-sectioned and partly removed of the sixth embodiment of the present invention.
Figure 17:
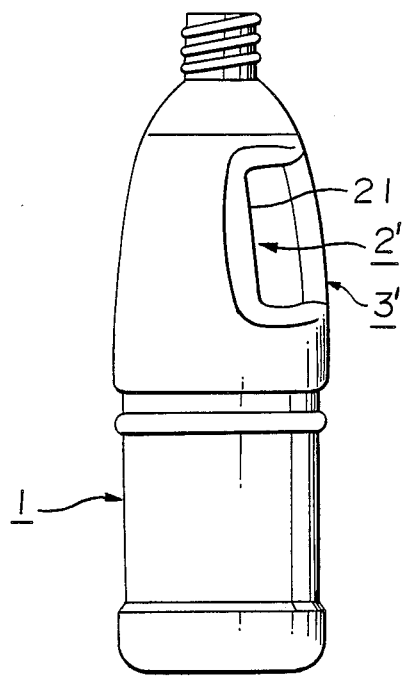
FIG. 17 is a front view showing a conventional blown bottle with a handle.

FIGS. 15 and 16 show an sixth embodiment of the present invention. In the Figures, the same reference numerals designate the same or corresponding parts.

The sixth embodiment of the present invention is the same as the first embodiment except that a small hole 36 is formed at the upper end surface 35 of the handle 3.

The small hole 36 may be plural in number as far as it is possible to receive therein a means for holding for instance a price card or the like. For example a price tag may be inserted into hole 36. 48 as shown by the two-dotted chain line. The size of the hole 36 may be made as desired as far as the hole is formed in the upper end surface 35 of the handle 3.

The handle 3 may be attached to the bottle 1 with their fitting parts embedded in the bottle so that the small hole 36 is exposed in the upper end surface 35 of the handle 3.

Obviously, numerous modifications and variations of the present invention are possible in light of the above teachings. It is therefore to be understood that within the scope of the appended claims, the invention may be practiced otherwise than as specifically described herein.

What is claimed is:

1. A thermoplastic blown bottle with a handle, wherein said bottle comprises a bottle body with a concave portion, having a vertical surface parallel to the longitudinal axis of said bottle and having upper and lower attaching surfaces at its upper circumferential part and a handle attached to said concave portion, wherein said handle comprises:

an elongated gripping portion;

two fitting portions formed as part of said handle at each end of said gripping portion and which extend in a substantially parallel direction to each other and perpendicular to said gripping portion and placed in the same direction relative to said gripping portion so as to be in contact with said upper and lower attaching surfaces;

engaging projections formed as part of said fitting portions and on the portions of said fitting portions most distance from said gripping portion engaging with the innermost portion of the concave portion of said bottle body adjacent to the vertical surface; and whereby the fitting portions reinforces the upper and lower attaching surfaces of said concave portion, of said bottle, and said vertical surface of the concave portion, in said bottle, reinforces the attachment of the engaging projections.

2. The blown bottle according to claim 1, wherein the outer surface of said gripping portion of the handle is substantially flush with the outer circumferential surface of said bottle at joint parts.

3. The blown bottle according to claim 1, wherein at least one raised or recessed stripe portion is formed in the upper surface of the upper fitting portion and the lower surface of the lower fitting portion.

4. The blown bottle according to claim 1, wherein vertically extending grooves are formed in the vertical surface of said concave portion.

5. The blown bottle according to claim 1, wherein an annular groove is formed in said bottle body at a position just below said concave portion so as to be communicated with the lower part of the concave portion.

6. The blown bottle according to claim 1, wherein at least one small hole is formed in the upper end of said handle.

* * * * *

UNITED STATES PATENT AND TRADEMARK OFFICE
CERTIFICATE OF CORRECTION

PATENT NO. : 4,964,522
DATED : OCTOBER 23, 1990
INVENTOR(S) : YUKIHIDE UMETSU ET AL.

It is certified that error appears in the above-identified patent and that said Letters Patent is hereby corrected as shown below:

ON TITLE PAGE: Item [30]

In the Foreign Application Priority Data, please delete "May 9, 1987" and insert --May 19, 1987--.

Signed and Sealed this

Twenty-eighth Day of April, 1992

*Attest:*

HARRY F. MANBECK, JR.

*Attesting Officer*     *Commissioner of Patents and Trademarks*